Nov. 8, 1927.

F. CARTLIDGE 1,648,110

CLUTCH MECHANISM

Original Filed March 28, 1918

Inventor:
Frank Cartlidge.
by Louis A. Maxson.

Attorney.

Patented Nov. 8, 1927.

1,648,110

UNITED STATES PATENT OFFICE

FRANK CARTLIDGE, OF CINCINNATI, OHIO, ASSIGNOR TO SULLIVAN MACHINERY COMPANY, A CORPORATION OF MASSACHUSETTS.

CLUTCH MECHANISM.

Original application filed March 28, 1918, Serial No. 225,278. Divided and this application filed September 15, 1926. Serial No. 135,697.

This invention relates to clutch mechanisms.

An object of this invention is to provide an improved clutch mechanism. A further object of this invention is to provide an improved clutch controlling mechanism whereby the parts may be controlled in an improved and more effective manner. Still another object of this invention is to provide an improved clutch mechanism of the friction disk type having provision for cushioning any shocks on the clutch disks thereby to materially reduce the wear and tear upon the related clutch parts. These and other objects and advantages of my improved construction will, however, hereinafter more fully appear.

This application is a division of my copending application Ser. No. 225,278, filed March 28, 1918.

In the accompanying drawing I have shown for purposes of illustration one embodiment which my invention may assume in practice.

In this drawing,—

Figure 1:
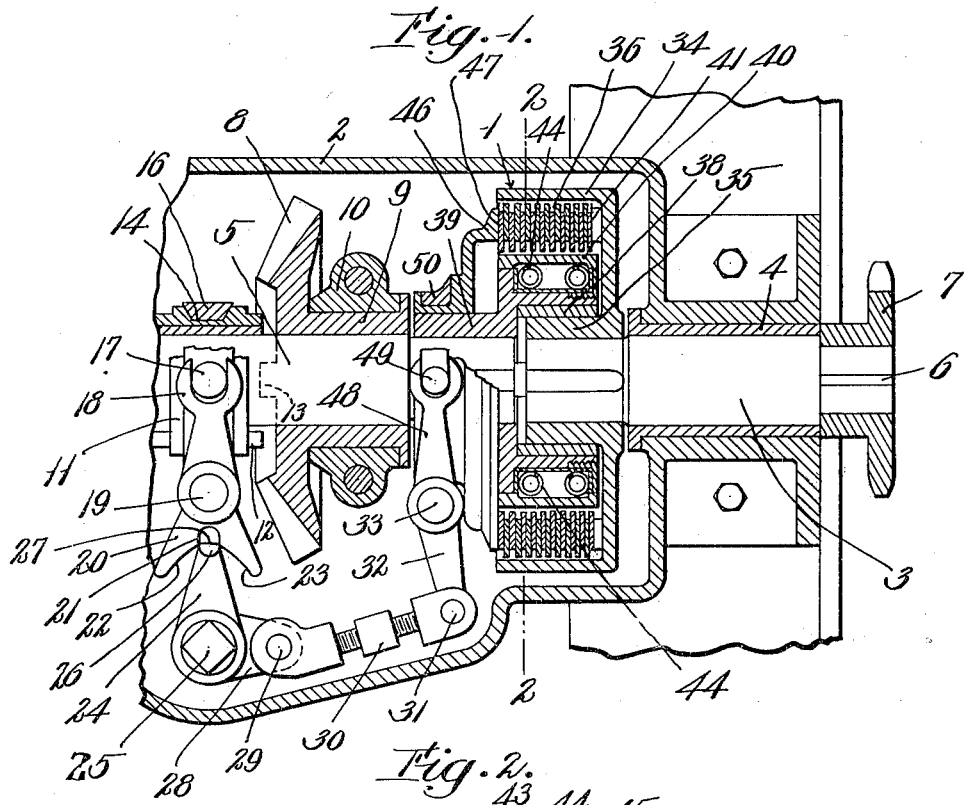
Fig. 1 is a horizontal sectional view of the improved clutch mechanism.
Figure 2:
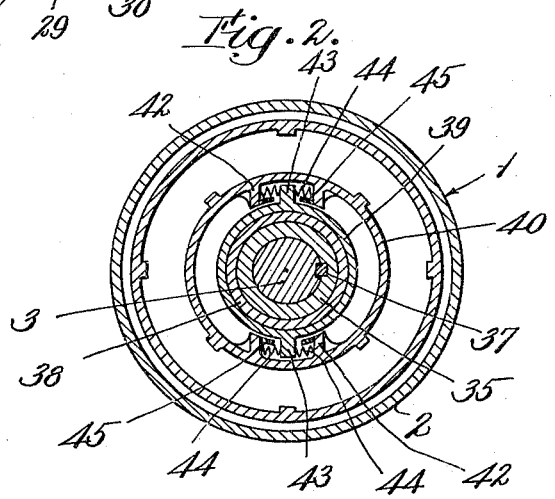
Fig. 2 is a vertical sectional view taken on line 2—2 of Fig. 1.

In this illustrative construction it will be observed that I have shown a clutch mechanism generally designated 1 which is preferably enclosed in a suitable casing 2 adapted to be filled with oil. Into this casing, a transversely disposed horizontal shaft 3, which is journaled in a suitable bearing 4 is extended and disposed end to end with a supplemental or stub shaft 5. The shaft 3 has secured thereto, at its outer end as by a key 6, a driven member 7, herein preferably in the form of a chain sprocket. As shown, the shaft 5 itself extends coaxially through a bevel driving gear 8 and is suitably journaled in the casing 2. As illustrated, the gear 8 is provided with a flanged sleeve 9 journaled in a suitable manner in a bearing 10 suitably carried on the bottom of the casing 2. Disposed adjacent the gear 8 is also a movable clutch member 11 splined to the shaft 5 and adapted to be reciprocated longitudinally thereof in such manner as to bring clutch teeth 12 thereon into engagement with cooperating clutch teeth 13 formed on the inner side of the bevel gear 8 and thus connect the bevel gear 8 to the shaft 5 to drive the latter. It will also be observed that this movable clutch member 11 is provided with an annular groove 14 housing within the same a cam-ring or band 16. This band 16 is also provided with oppositely disposed pins 17 adapted to be engaged by an ordinary forked clutch shipper 18 suitably pivoted at 19 on the casing 2.

Operatively connected to this clutch shipper member 18 is the controlling means for shifting the member 11 back and forth and controlling the connection of the shaft 5 and gear 8. This means, which forms no part of the invention except as it cooperates therewith, includes a rearwardly disposed bifurcated projection 20 carried on the clutch shipper member 18 and having a slot 21 between its portions and curved surfaces 22 and 23 on opposite sides of the same, the said surfaces preferably being struck from a different center and disposed as shown. Co-operating with this member 18 is a manually adjustable member 24, pivoted at 25 and having an upstanding portion 26, preferably provided with a curved surface 27 struck with the same radius as the surface 22. As shown, this member 24 is in turn also provided with a crank 28 pivotally connected at 29 to a link connection 30 of adjustable length, which link connection is in its turn pivotally connected at 31 to a lever 32 which is pivoted at 33 and operatively connected to a suitable mechanism for operating a friction clutch hereinafter described, the function of which is to control the connection of the shafts 3 and 5.

As shown, in my improved construction the shaft 3 has keyed thereto a friction housing member 34 having an internal bearing sleeve 35 and carrying a plurality of clutch disks 36 inside its periphery. The sleeve 35 of this member 34 is keyed at 37 to the shaft 3 and also carries a bearing sleeve 38 for the member 39 journaled on said bearing sleeve 38 and having a hub portion keyed to the adjacent end of the shaft 5. As illustrated, the member 39 is also operatively connected to a member 40 carrying clutch disks 41 which are interleaved with the clutch disks 36. It will also be noted that one of these members 39 and 40, for instance the member 40, is herein provided with a plurality of spaced lugs 42 adapted to cooperate with lugs 43 on the other member, herein the member 39, against the action of oppositely disposed coiled springs 44. Stops 45 are also provided to retain the springs 44 in their operative relation and to transfer the thrust of the lugs 43 to the lugs 42 after the springs have been compressed a predetermined distance. It will thus be observed that while the clutch disks 36 and 41 may cooperate, the member 40 carrying the disks 41 is initially resiliently connected to the member 39 and the shaft 5, while the member 34 is directly and rigidly connected to the shaft 3, all in such a manner as to produce improved results hereinafter more fully brought out, when one of the sets of clutch disks, as for instance the set of clutch disks 41, is moved laterally relative to the other. This movement as shown herein is accomplished by means of a reciprocable actuating member 46 having an annular face 47 engageable with the outer clutch disk and reciprocable relative to the hub of the member 39 on the shaft 5 when a clutch shipper 48 connected to the lever 32 is moved with the latter to engage suitable pins 49 carried on a collar 50 on the member 46.

In the operation of my improved construction it will be evident that with the movable clutch member 11 in the neutral position as shown in Fig. 1, the drive gear 8 will rotate freely relative to the shaft 5 and the gear will not impart rotation to that shaft or to the shaft 3. When, however, the controlling mechanism above described is operated, as for instance by means of an outer controlling lever, not shown, suitably connected to the member 24, the member 11 is moved to the right to connect the gear 8 to the shaft 5. Obviously, this movement of the member 24 will cause a corresponding movement of the connections 28, 30, 32, etc., as clearly described in my copending application mentioned above, in such manner as to cause the member 46 to be reciprocable relative to the member 39 and thereby press the clutch disks 36 and 41 together to connect the two members 40 and 34 and the shafts 5 and 3. When the friction clutch 36, 41 is applied the member 40 is initially resiliently connected to the member 39 by means of the springs 44, the members 39 and 40 thereafter being rigidly connected together through the lugs 43 and the stops 45. Therefore it is obvious that the improved resilient connection for one of the elements of the friction clutch acts effectually as a cushion tending to remove any sudden shocks from the clutch disks or the teeth 12 and 13 and thereby tends to reduce materially the wear and tear upon these clutch elements and to avoid friction clutch slip.

As a result of my improved construction it will be observed that an exceedingly efficient control is obtained wherein all sudden shocks on the friction clutch elements are effectually cushioned and at the same time that it is possible to produce an exceedingly compact construction adapted to be housed in a suitable casing and preferably immersed in oil in such a manner as to enable it to operate at the highest efficiency.

While I have in this application specifically described one embodiment which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a clutch mechanism, a friction clutch including a plurality of rotatable elements, means for driving one of said elements, and a resilient shock absorbing connection between said element and said driving means, asid connection comprising recesses formed in one of said elements, a plurality of coil springs mounted in tandem in said recesses and a lug integral with another of said elements and projecting into one of said recesses and cooperating with said springs to yieldingly resist relative movement of said elements in either direction, said lug also adapted to engage a wall of said recess after a predetermined relative movement to rigidly resist further relative movement.

2. In a friction clutch mechanism, the combination with a driving shaft, a driven shaft and cooperating friction elements respectively carried by the same, of a shock absorbing connection between one of said shafts and the friction elements comprising a member rotatable with the friction elements and mounted on said shaft for relative rotative movement in both directions, means including springs for yieldingly resisting said relative movement, and cooperating rigid stop lugs on said shaft and said member for positively limiting said relative movement in either direction beyond a predetermined amount.

In testimony whereof I affix my signature.

FRANK CARTLIDGE.